US007702330B2

(12) United States Patent
Alexander et al.

(10) Patent No.: US 7,702,330 B2
(45) Date of Patent: Apr. 20, 2010

(54) METHOD AND APPARATUS FOR WIRELESS MOBILITY MEASUREMENTS

(75) Inventors: Thomas Alexander, Mulino, OR (US); Eran Karoly, Oak Park, CA (US); Jerry Lee Perser, Jr., Canoga Park, CA (US); Sitarama Penumetsa, Beaverton, OR (US)

(73) Assignee: Veriwave Incorporated, Beaverton, OR (US)

( * ) Notice: Subject to any disclaimer, the term of this patent is extended or adjusted under 35 U.S.C. 154(b) by 930 days.

(21) Appl. No.: 11/461,097

(22) Filed: Jul. 31, 2006

(65) Prior Publication Data
US 2008/0026748 A1    Jan. 31, 2008

(51) Int. Cl.
*H04Q 7/20* (2006.01)
(52) U.S. Cl. ............... 455/432.1; 455/67.11; 455/67.14; 370/241
(58) Field of Classification Search ............... 455/432.1, 455/67.11, 67.14, 115.1, 226.1, 423, 115.2; 370/338, 241, 389, 247, 251
See application file for complete search history.

(56) References Cited

U.S. PATENT DOCUMENTS

| 5,752,164 | A | 5/1998 | Jones |
| 6,091,950 | A | 7/2000 | Remy |
| 6,269,330 | B1 | 7/2001 | Cidon et al. |
| 6,724,730 | B1 | 4/2004 | Milinarsky et al. |
| 6,970,798 | B1 * | 11/2005 | Cao et al. .................... 702/120 |
| 7,006,467 | B2 | 2/2006 | Anton, Jr. et al. |
| 7,187,193 | B2 * | 3/2007 | Wallquist .................... 324/765 |
| 7,298,702 | B1 | 11/2007 | Jones et al. |
| 2003/0063566 | A1 * | 4/2003 | Abramovitch et al. ...... 370/241 |
| 2003/0100299 | A1 | 5/2003 | Ko et al. |
| 2007/0211640 | A1 * | 9/2007 | Palacharla et al. .......... 370/241 |
| 2008/0020746 | A1 * | 1/2008 | Alexandar et al. .......... 455/423 |

OTHER PUBLICATIONS

U.S. Appl. No. 10/815,823, filed Apr. 2, 2004, Applicant: Alexander, Thomas, titled Location-Based Testing for Wireless Data Communication Networks.
Office Action in U.S. Appl. No. 10/815,823 dated Nov. 21, 2008.

* cited by examiner

*Primary Examiner*—CongVan Tran
(74) *Attorney, Agent, or Firm*—Dennis R. Haszko; Eaton Peabody Patent Group, LLC

(57) ABSTRACT

Apparatus and methods enabling the efficient and repeatable measurement of mobility performance of wireless data communications equipment are described. This is particularly useful for testing the impact of roaming of Wireless Local Area Network (WLAN) devices, such as clients, between their counterparts, such as access points. The apparatus and methods include controlled emulation of roaming by WLAN devices, using a set of WLAN tester units, by activating and deactivating instances of emulated devices on different tester units to simulate the physical translation of the actual WLAN devices in an environment. Simulation of increasing and decreasing distance during the roaming process is also rendered possible. This enables various mobility performance measurements to be made on WLAN devices in a repeatable manner, free from artifacts due to device manufacturing tolerances.

37 Claims, 6 Drawing Sheets

METHOD AND APPARATUS FOR WIRELESS MOBILITY MEASUREMENTS

RELATED APPLICATIONS

This application is related to co-pending U.S. patent application Ser. No. 11/488,396 entitled "METHOD AND APPARATUS FOR CONTROLLABLE SIMULATION OF MOBILITY" filed on Jul. 18, 2006.

FIELD OF THE INVENTION

The present invention generally relates to wireless data communications test and measurement, and, more specifically, to systems and methods for measuring the mobility performance of wireless data communication devices.

BACKGROUND OF THE INVENTION

Wireless Local Area Network (WLAN) equipment, such as clients and Access Points (APs), operate in an environment where the APs are fixed in location, but the client devices may move about from place to place. Mobile client devices typically move from the coverage area of one AP to another, a function referred to as roaming. As a client moves away from an AP, the signal strength (and thus the signal quality) of its link to that AP decreases. If the distance becomes great enough, the client can no longer transfer data to that AP; the client must find a closer AP and connect to such closer AP. This process of disconnecting from one AP and reconnecting to another AP requires a significant amount of processing power, and often involves a substantial delay and possible loss of data. It is therefore of interest to quantify the mobility performance of WLAN devices, in terms of the amount of time required to roam between APs, and the wireless data lost thereby.

Further, if a large number of clients are simultaneously roaming within a WLAN system, a heavy load can result. For example, a WLAN system may be able to support the mobility of a single client, but may fail to adequately support the mobility of 100 clients. It is therefore of interest to quantify the mobility performance of WLAN devices in terms of the number of simultaneously roaming devices that can be supported.

Further, if many clients continue to roam for a long duration of time, a significant number of state changes may take place within the WLAN system. This in turn may cause stability or performance problems in the WLAN equipment. It is therefore of interest to quantify the mobility performance of WLAN devices in terms of the duration of time for which roaming can be carried out without problems.

Further, the process of disconnecting a client from one AP and reconnecting to another AP involves co-operative protocol transactions that must be supported by both the client and the two APs. If either the client or the AP fails to properly implement these protocol transactions, then the mobility performance of the entire WLAN system may be adversely affected. However, it is necessary to distinguish those performance issues that may be induced by clients, from those performance issues that may be induced by APs. It is therefore of interest to separately quantify the mobility performance of client devices and APs.

Heretofore, the measurement of the mobility performance of WLAN equipment has been performed by setting up three or more actual WLAN devices, at least one of which is a client device and at least two of which are AP devices; causing the WLAN client device or devices to roam between the AP devices; and then measuring mobility performance according to the desired metric.

One approach that has been implemented to date to carry out mobility performance measurements consists of placing real WLAN equipment (both real clients and real APs) within a large physical space, and then physically moving the devices in order to increase or decrease the distance between them. The mobility performance metrics may be quantified by observing the behavior of the WLAN clients and APs as the relative distances between them change. Unfortunately, this method requires a large floor space, is highly labor-intensive, subject to variations due to human error, and is prone to interference and external signals. Further, it is neither cost-effective nor repeatable. Still further, it is very difficult to predict or control the points in time when different clients may elect to roam, which renders the measurement process inaccurate, or otherwise error-prone.

Another approach that has been implemented to date consists of placing real WLAN equipment (again, real clients and real APs) into separate shielded chambers that are interconnected using variable RF attenuators. Increasing the amount of attenuation interposed between an AP and a client simulates an increase of distance between them. Conversely, decreasing the amount of attenuation simulates a decreasing distance between them. Therefore, by increasing the amount of attenuation between a client and a first AP, and simultaneously decreasing the amount of attenuation between the same client and a second AP, the client may be caused to roam from the first AP to the second AP. Mobility performance metrics may be quantified when the client roams. This approach avoids some of the problems of the first mentioned method. It can be automated, eliminates the issues of interference, and affords some degree of control of the point at which the actual roaming takes place. Nevertheless, it too suffers from severe limitations. The roaming sequences that may be implemented are highly constrained, due to the use of fixed physical topologies of attenuators to define the movement of clients; many roaming patterns cannot be emulated, or otherwise created, without being adversely impacted by RF coupling and leakage issues. The test setup is expensive and bulky, and does not scale to large numbers of clients and APs. Further, the approach suffers from unpredictable variations due to the manufacturing tolerances of the client and AP radio transceivers. Still further, such approach relies on the use of both clients and APs in the same test; as a consequence, the mobility performance of the clients cannot be separated from that of the APs, and the only measurements that can be made are relative ones, i.e., the performance of a specific client in conjunction with a specific AP.

SUMMARY OF THE INVENTION

In general, the present invention illustrates an improvement that replaces one side of the WLAN link—i.e., either the client or the AP—with a piece of dedicated WLAN test equipment, and tests the other side of the WLAN link—i.e., the AP or client, respectively—in an absolute sense, and without being subject to topology limitations or manufacturing tolerances, including the manufacturing tolerances of the test equipment itself.

Accordingly, one aspect of the invention provides an improved method for implementing the efficient measurement of the mobility performance of WLAN equipment. Another aspect of the invention provides a method of measuring the mobility performance of a WLAN device without being subject to manufacturing tolerances. A further aspect of the invention provides a method of measuring the mobility performance of WLAN devices in a scalable manner, whereby a large number of WLAN devices may be tested as a single system. Yet a further aspect of the invention provides a method of measuring the mobility performance of WLAN devices in a flexible manner, wherein the roaming sequence used by different WLAN devices is not constrained by the physical topology.

The present invention provides for a method and apparatus for measuring the mobility performance of wireless data equipment, including a plurality of WLAN tester units that possess mechanism for simulating mobile WLAN devices, without requiring actual physical movement of these devices. The tester units operate in a synchronized fashion under the control of a central controller to activate and deactivate instances of each simulated mobile device in such a way as to simulate their physical motion. The Device Under Test (DUT) is caused to exchange packet data with the instances of the simulated mobile devices as they are activated and deactivated, and measurements are made on the packet data streams thus exchanged to yield the mobility performance of the DUT.

In one embodiment, each WLAN tester unit contains: a tester controller for general control of the tester, responsive to commands from the central controller; a station (STA) context memory; a roaming scheduler, schedule memory and STA context activation control logic that schedules and carries out the activation and deactivation of instances; STA scheduler and time-multiplexed Medium Access Control (MAC) logic for simulating the MAC behavior of the mobile devices; an radio frequency/intermediate frequency (RF/IF) chain and baseband processing function for transmitting and receiving wireless packets to the DUT; distance simulation control logic operatively coupled to the MAC and RF/IF function for simulating the effective distance of each mobile device instance from the DUT; and statistics counters and statistics calculation logic to make measurements on the wireless packets that are exchanged with the DUT. It should be understood that, for purposes of illustrative brevity, the present description refers to an emulated WLAN AP or client as a station or STA.

The tester controller may preferably communicate with, receive commands from, and send measurements to, a central controller that controls and co-ordinates the activities of the WLAN tester unit in conjunction with the remainder of the test setup, including other instances of the WLAN tester unit that may be used as part of the same test setup.

The STA context memory may preferably hold a plurality of contexts defining the state of a corresponding plurality of instances of simulated mobile devices (stations, or STAs). A particular simulated STA may have one context assigned to it in each WLAN tester unit, and further only one context may be active (across all of the WLAN tester units) for each simulated STA, all other contexts for the same simulated STA being inactive.

The roaming scheduler in conjunction with the schedule memory may preferably control the activation or deactivation of contexts for specific simulated STAs. Activation and deactivation may be carried out in such a manner that the DUT perceives that the simulated STAs are moving away from a first location and towards a second location. The STA context activation control may serve to actually activate or deactivate the contexts by modifying the corresponding locations in the STA context memory.

The STA scheduler and time-multiplexed MAC logic may preferably be operative in conjunction to generate WLAN frames to be transmitted to the DUT, and to process WLAN frames received from the DUT, in such a way that the desired WLAN MAC protocol functions are implemented for the plurality of simulated STAs whose contexts are active in the STA context memory.

The distance simulation control logic may preferably be operative to control the perceived effective distance from the DUT of each simulated STA whose context is active in the STA context memory. Distance simulation may be accomplished by controlling the effective frame error ratio (FER) and signal level.

The statistics calculation logic and associated statistics counters may preferably be operative to monitor the transmitted and received WLAN frames for the purposes of measurement, and may calculate roaming performance parameters such as, but not limited to, roaming delay, number of packets lost by the DUT during roaming, and maximum roaming rate.

Advantageously, parameters representing the effective simulated distance of each simulated STA may be written into the STA context memory by the roaming scheduler, read out by the STA scheduler when packets for that simulated STA are being processed, and used by the distance simulation control to adjust the effective FER and signal level for that simulated STA.

Advantageously, the roaming scheduler may modify the simulated distance parameters for each simulated STA in the STA context memory in such a way as to simulate the effect of STAs moving away from one interface or AP of the DUT prior to roaming, and moving towards another interface or AP of the DUT after roaming. (In a "real-world" roaming scenario, an STA will move away from the AP to which it is presently connected, and towards another AP to which it will eventually connect. The actual roaming "event" occurs at some point in between.)

Advantageously, the roaming scheduler and schedule memory functions may be implemented by the central controller on behalf of all of the WLAN tester units, so as to simplify the WLAN tester units and reduce the amount of coordination between them during the roaming process.

Advantageously, intercommunication mechanism may be provided between a plurality of WLAN tester units, and may enable the state of application layer traffic being generated by each simulated STA to be moved from WLAN tester unit to WLAN tester unit during the process of disabling a first simulated STA instance and enabling a second simulated STA instance. This may allow application layer context to be maintained across roaming events.

BRIEF DESCRIPTION OF THE DRAWINGS

The description of the preferred embodiments is taken in conjunction with the accompanying drawings, wherein.

DETAILED DESCRIPTION

Figure 1:
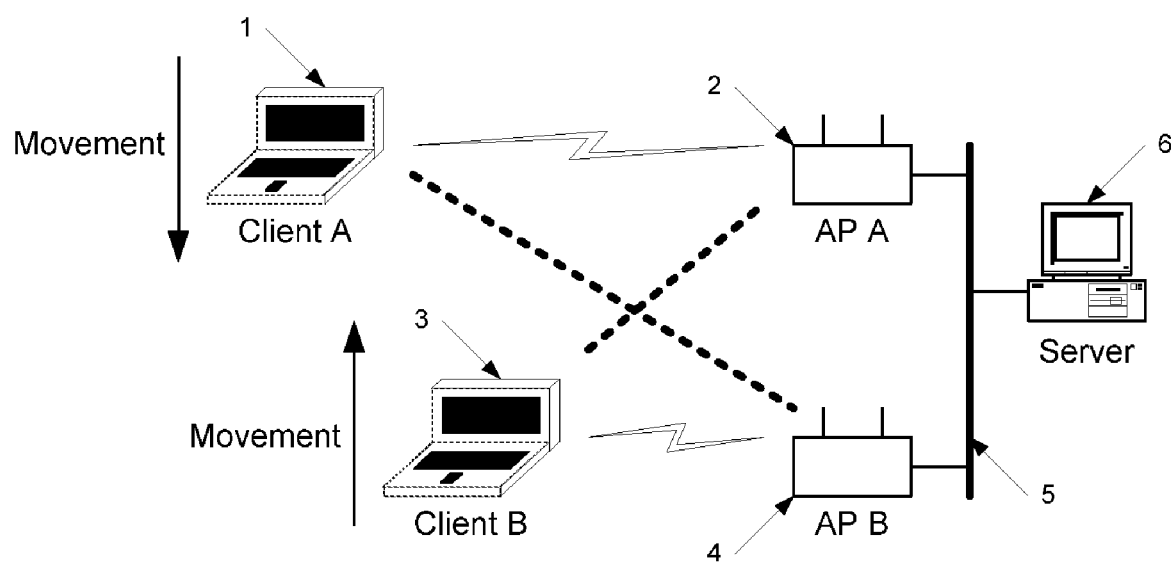
FIG. 1 is a diagram illustrating an exemplary arrangement of WLAN clients, APs, and servers in a "real-life" (i.e., non-test) environment, wherein the clients roam between APs while exchanging information.

With reference to FIG. 1, the commonly known roaming of a plurality of Wireless LAN (WLAN) client devices 1, 3 between a plurality of WLAN Access Point (AP) devices 2, 4 in conjunction with a server 6 is illustrated. Client 1 is initially connected to AP 2 and exchanging data with server 6, while client 3 is initially connected to AP 4 and also exchanging data with server 6. Client 1, being mobile, may elect to disconnect from AP 2 and reconnect to AP 4 in order to maintain its connection with server 6. The time interval between the cessation of data transfer to/from server 6 via AP 2 and the resumption of data transfer to/from server 6 via AP 4 is commonly referred to as the roaming delay. Similarly, client 3, also being mobile, may elect to disconnect from AP 4 and reconnect to AP 2 in its turn, and the roaming delay for this client is the interval between the cessation of data to AP 4 and the resumption of data to AP 2.

Unlike that which is illustrated in FIG. 1, the present invention emulates the mobility of a client, or a plurality of clients, in a space occupied by a plurality of APs, without requiring physical movement of either clients or APs. The Device(s) Under Test (DUTs) may either be clients or APs. If the DUT includes a client or clients, the tester emulates the APs; if the DUT includes APs, the tester emulates a client or clients.

Figure 2:
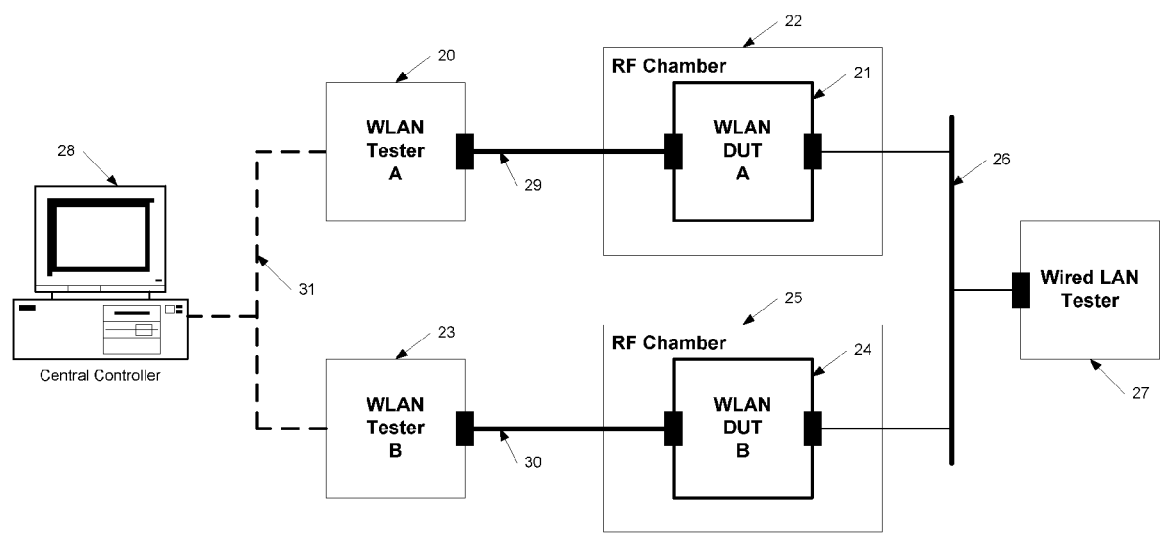
FIG. 2 is a representation of an exemplary WLAN test setup according to an embodiment of this invention.

With reference to FIG. 2, the general arrangement of a system for performing roaming tests on a plurality of Wireless LAN (WLAN) DUTs 21, 24 may include a corresponding plurality of WLAN tester units 20, 23; wired LAN tester unit 27; central controller 28; and interconnect cables 26, 29, 30 and 31. The DUTs may be placed within a corresponding number of RF chambers 22, 25, the purpose being to isolate them from external interference and prevent radiated emissions from interfering with external devices. Cables 29 and 30 are preferably RF coaxial cables or waveguides. Cables 26 may preferably be twisted-pair or optical fiber cables that connect the wired interfaces of DUTs 21 and 24 to wired LAN tester unit 27. Cables 31 may preferably be LAN or control cables that interconnect central controller 28 with WLAN tester units 20 and 23.

During the conduct of a roaming test on DUTs 21, 24, wireless data signals may be transmitted and received by WLAN tester units 20, 23 via cables 29, 30, and wired data signals may be concurrently transmitted and received by wired LAN tester unit 27 to DUTs 21, 24 via cables 26. Measurements of roaming delay, packet loss, data throughput, etc. may be made on the responses of DUTs 21, 24 to these signals, and the results may preferably be recorded as the characteristics of DUTs 21 and 24.

When DUTs 21, 24 are APs, wired LAN tester unit 27 may preferably act in place of a server (element 6 in FIG. 1) within a system of real clients and APs. If DUTs 21, 24 are client devices, wired LAN tester unit 27 may not be required.

It is understood that a plurality of WLAN and/or wired LAN tester units may be used in a single test setup, depending on the number of DUTs that are to be configured and tested within a single system and the interfaces present on the DUTs. One tester unit of the appropriate type may preferably be connected to each interface (wired or wireless) of a DUT. A reference to an aspect of WLAN tester unit 20 shall hereinafter be taken to apply equally to all other instances of WLAN tester units that may be present in the system (i.e., the test setup of the present invention).

It is further understood that RF coaxial cables or waveguides 29, 30 may be replaced with airlinks utilizing antennas connected to WLAN testers 20, 23 and WLAN DUTs 21, 24. The functions and operating characteristics of WLAN testers 20, 23 as well as the procedures for conducting the test and performing the measurements remain unchanged whether antennas, cables or waveguides are used. The techniques for substituting cables for airlinks and vice versa are well known to persons skilled in the art, and will not be described herein. A reference to an RF cable or waveguide shall hereinafter be taken to apply equally to a test system employing airlinks.

Central controller 28 may communicate with the WLAN tester units to control and coordinate their activities and conduct roaming tests desired by the user of the test system. Central controller 28 may preferably utilize a standard host computer or workstation, such as, but not limited to, a personal computer, and may perform user-interface, control, results processing and display functions. A comprehensive control and analysis program may be implemented on central controller 28 in order to control and co-ordinate the tester units and analyze the data that they collect. User control of the tester units may be accomplished through a Graphical User Interface (GUI), which may perform normal user interface functions, including such elements as providing the user with access to roaming or data traffic simulation parameters, as well as including the ability to format and output reports based on data gathered by tester units 20, 23 and processed by central controller 28.

Figure 3:
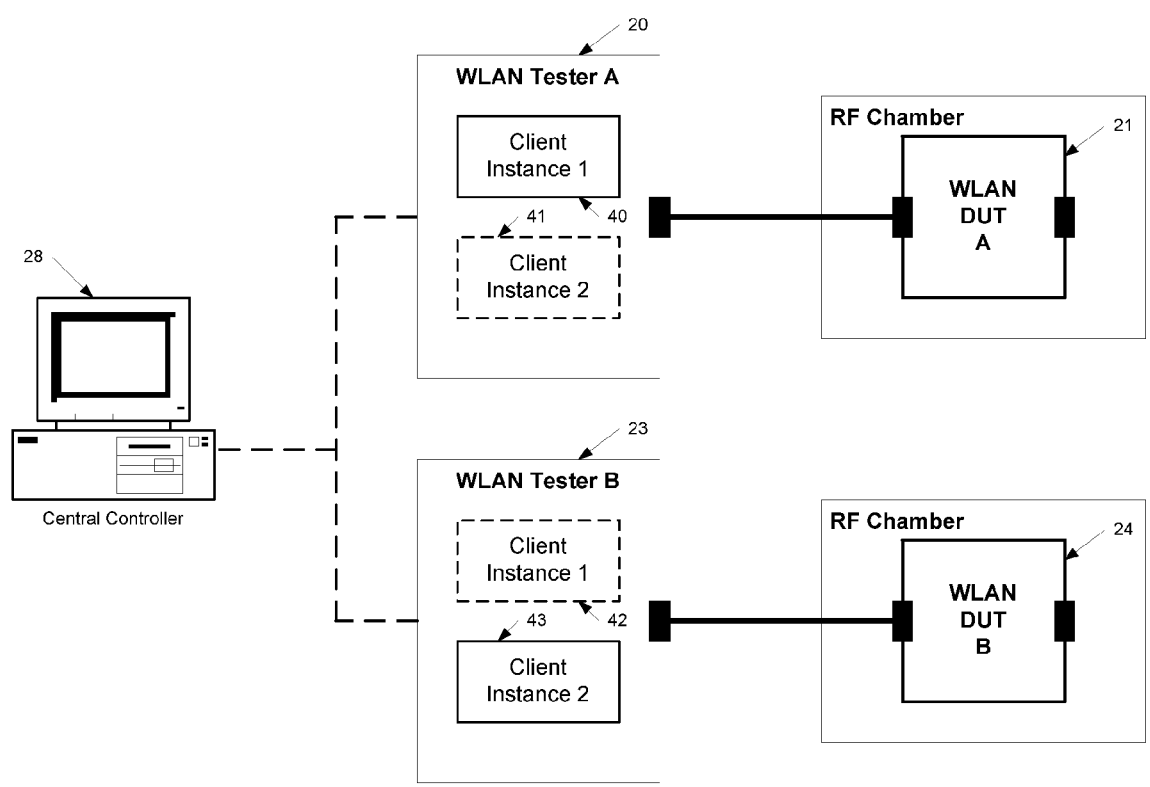
FIG. 3 is a representation of an exemplary configuration of client instances within WLAN testers according to an embodiment of this invention.

An exemplary block diagram representing a mechanism of simulating roaming of clients is shown in FIG. 3. It is understood that this is a high-level representation for the purposes of discussion, and shows how the roaming of client devices may be emulated by WLAN testers 20, 23, when DUTs 21, 24 are APs. It is further appreciated that if DUTs 21, 24 are client devices, then WLAN testers 20, 23 may emulate APs, but the general principle of operation is otherwise unchanged, with the sole exception that the client devices remain fixed in location but the emulated APs are "virtually moved" past the clients to cause roaming to occur. In light of this, a reference to a DUT is hereinafter taken to apply equally to a WLAN AP or a client, and the corresponding reference to a WLAN tester unit may be taken to mean a unit emulating the converse, i.e., a client or AP respectively. For brevity, an emulated WLAN AP or client is hereinafter collectively referred to as a station or STA.

With reference to FIG. 3, each WLAN tester unit 20, 23 may support one or more "instances" (i.e., spatial position representations) of clients that are expected to be associated with WLAN DUTs 21, 24 respectively. As shown in the figure, WLAN tester unit 20 may support instance 40 of a first client, and instance 41 of a second client; WLAN tester unit 23 may support instance 42 of the same first client, and instance 43 of the same second client. It is understood that any desired number of client instances may be supported by each WLAN tester unit, and this number may further correspond to the maximum number of clients that are desired to be associated with the corresponding DUT at any one time.

One instance of an emulated client may be active at any one time, representing thereby a particular spatial position at the corresponding physical client is present; all other instances of the same emulated client within other WLAN tester units may preferably be rendered inactive, representing thereby positions at which the emulated client are not present. With further reference to FIG. 3, client instances 40, 43 are denoted as being active (marked in solid lines), and client instances 41, 42 are denoted as being inactive (marked in dotted lines).

Roaming of a client from AP to AP, representing a translation of a physical client from spatial position to spatial position, may then be accomplished by progressively deactivating the currently active client instance and activating some other client instance on a different WLAN tester unit.

In the exemplary system represented by FIG. 3, mobility of clients between DUTs 21, 24 may be accomplished by deactivating client instances 40, 43 and activating client instances 41, 42. Activation of a client instance may consist of logically connecting the client instance to the corresponding DUT, and may further entail the transfer of data to or from the DUT. Deactivation of a client instance may consist of the cessation of data transfer to or from the DUT, and may further entail the logical disconnection of the client instance from the DUT.

Figure 4:
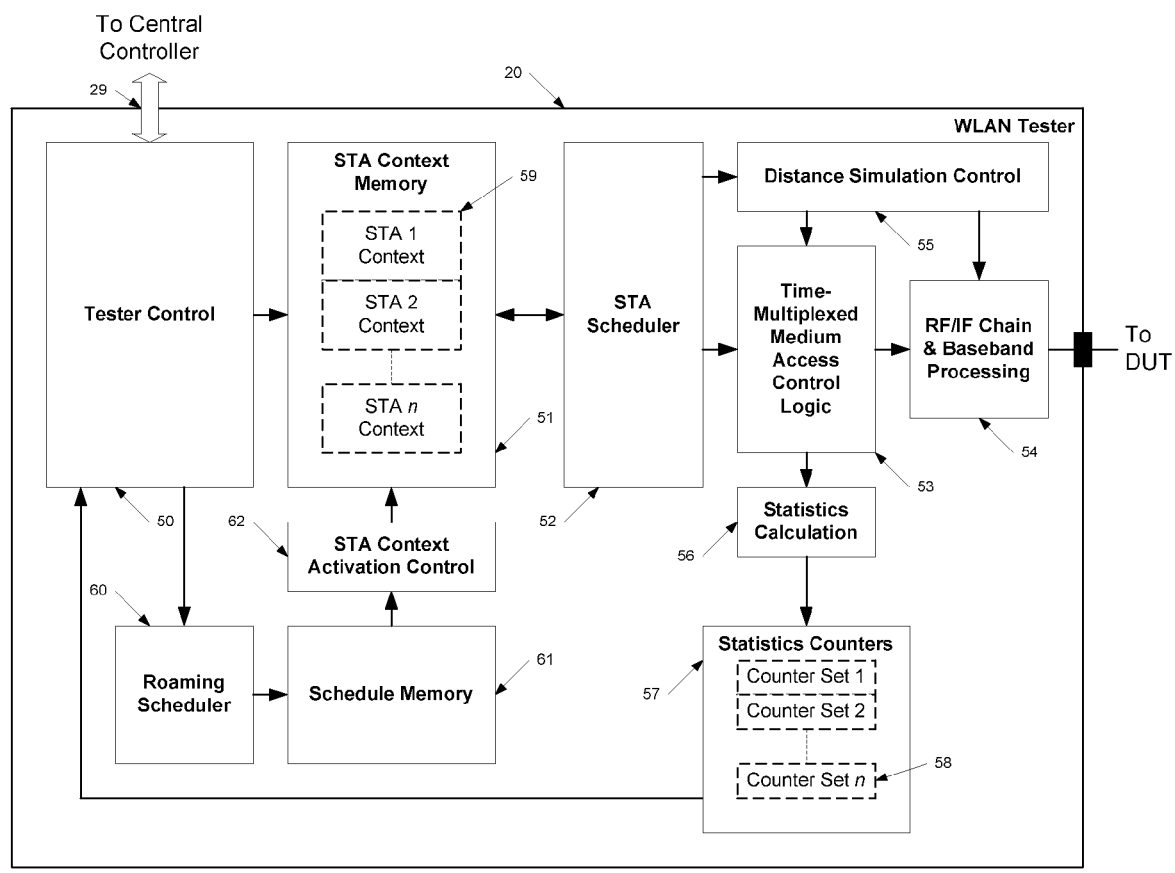
FIG. 4 is a schematic block diagram of an embodiment of the WLAN tester unit.

With reference to FIG. 4, an embodiment of WLAN tester unit 20 includes: tester control 50, which may perform overall control and synchronization functions and communication with central controller (element 28 in FIGS. 2 and 3) via LAN or control cables (element 31 in FIG. 2); station (STA) context memory 51 that holds STA context blocks 59 for each of the client or AP instances (i.e., STA instances) emulated; STA context activation control logic 62 operatively coupled to STA context memory 51 to activate or deactivate specific STA context blocks 59; STA scheduler 52 operatively coupled to STA context memory 51, that may schedule and select between the activated STA contexts to determine the station for which the next packet must be transmitted; time-multiplexed Medium Access Control (MAC) logic 53, operatively coupled to STA scheduler 52 and an RF/IF/baseband processor 54, that may implement the MAC or link layer functions required by the WLAN data transfer protocol for the selected STA context, and further simulate distance under command from the distance simulation control mechanism 55 by way of receive and transmit error injection; RF/IF chain and baseband processor 54 operatively coupled to MAC logic 53, to perform modulation, demodulation, frequency translation, power control and amplification functions, and interface RF signals to the WLAN DUT; statistics calculation logic 56, which may be operatively coupled to MAC logic 53, and preferably measures performance statistics associated with roaming functions; and statistics counter memory 57 containing statistics counter sets 58, which may store performance statistics calculated for different emulated stations by statistics calculation logic 56. Test port controller 50 may preferably control the contents of STA context memory 51, the operation of MAC logic 53, and the operation of distance simulation control 55. Further, test port controller 50 may read the contents of statistics counter memory 57 for notification to central controller (element 28 in FIGS. 2 and 3).

In an embodiment of the present invention, WLAN tester unit 20 may contain a roaming scheduler 60 operatively coupled to schedule memory 61. Activation of an STA instance in WLAN tester unit 20 may be performed by rendering the corresponding one of the STA context blocks 59 active, i.e., indicating that the emulated STA is available for scheduling and traffic generation by STA scheduler 52. Roaming scheduler 60 may preferably determine the sequence in which STA contexts 59 are activated and deactivated over time. Further, test port controller 50 may control the functions of roaming scheduler 60 and the contents of schedule memory 61. This results in a distributed control of roaming functions such that each WLAN tester unit in the system separately determines which STA instances are to be activated or deactivated at a given time. It will be appreciated that a synchronization mechanism may advantageously be used between the different WLAN tester units to ensure that activation and deactivation of STA instances occurs in unison across the system. Such synchronization mechanisms are well known in the prior art and will not be described further.

In another embodiment of the present invention, roaming scheduler 60 and schedule memory 61 may advantageously be implemented in central controller 28, and commands to activate or deactivate one or more of STA context blocks 59 may be issued from central controller (element 28 in FIGS. 2 and 3) to tester control 50 via LAN or control cables (element 31 in FIG. 2). Tester control 50 may in turn activate or deactivate the appropriate STA context block 59. In this case, it will be appreciated that no synchronization between WLAN tester units is necessary, leading to a simplification of WLAN tester unit 20.

STA context blocks 59 within STA context memory 51 may define "virtual" WLAN stations—i.e., STAs that are emulated to represent actual stations in a real WLAN system, either clients or APs. The information in STA context blocks 59 may define parameters, such as addressing information, physical layer and medium access parameters, traffic generation information and simulated distance to the DUT, that may enable STA scheduler 52 operating in conjunction with MAC logic 53, distance simulation control 55 and RF/IF and baseband processor 54 to correctly simulate the WLAN stations.

Advantageously, tester control 50 may alter the simulated distance to the DUT for an emulated STA represented by one of the STA context blocks 59 in a continuous or stepwise fashion, before deactivating or after activating the STA instance. Simulation of varying distance between an emulated STA and a DUT may preferably be used to indicate to the DUT that the emulated STA is moving further away from the DUT prior to roaming to a different DUT, or approaching closer to the DUT after connecting to it. (In a "real-world" roaming scenario, an STA will move away from the AP to which it is presently connected, and towards another AP to which it will eventually connect. The actual roaming "event" occurs at some point in between.) It will be appreciated that a closer approximation of the behavior of real clients is thereby produced, such that the DUT responds in the same way to the emulated client as if it were a real client roaming in its presence.

Simulation of varying distance during the roaming process may be done by updating a simulated distance parameter in the context block 59, which may in turn be passed to distance simulation control 55 for controlling MAC and RF/IF functions in a manner such that the DUT with which the emulated STA is exchanging traffic experiences the same effects as if the emulated STA were moving towards or away from the DUT. It should be noted that the action and effect of distance simulation control 55 and the method of controlling the MAC and RF/IF functions on a per-STA basis to implement distance simulation are discussed in co-pending U.S. patent application Ser. No. 11/488,396, filed on Jul. 18, 2006, and herein incorporated by reference. As such, it is assumed that the details of such distance simulation mechanism are available to a person skilled in the art and need not be discussed further herein.

Figure 5:
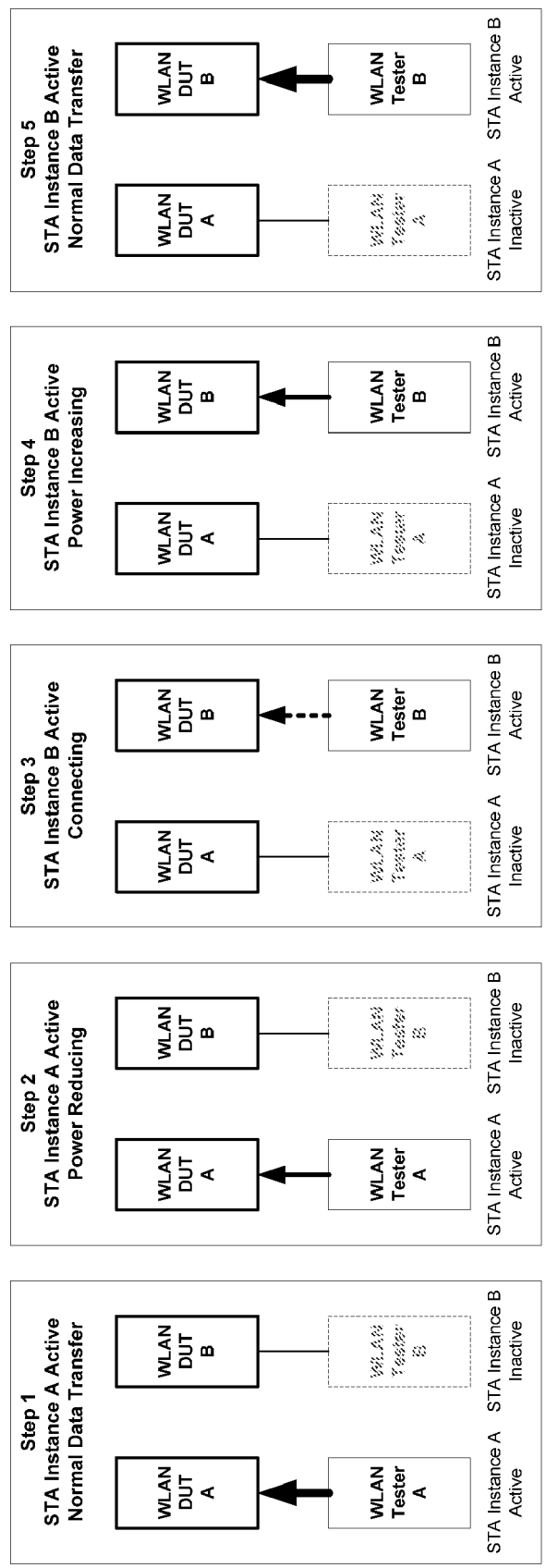
FIG. 5 is a representation of the method used to simulate the roaming of WLAN stations in accordance with an embodiment of the WLAN tester unit.

With reference to FIG. 5, one possible sequence of steps whereby a single emulated STA roams from a first DUT (WLAN DUT A) to a second DUT (WLAN DUT B) is illustrated. It will be appreciated that this is only one of many possible roaming scenarios that may be tested with the embodiments described herein, and also that the general process is applicable to any number of emulated STAs roaming between any number of DUTs.

Initially, a first instance of the emulated STA (labeled "STA Instance A") on a first WLAN tester unit (labeled "WLAN Tester A") may be active and associated with a first DUT (labeled "WLAN DUT A"). Normal data transfer between the emulated STA instance and the DUT may take place.

The process of roaming may begin at the second step. STA instance A may reduce its power and may further implement other functions to indicate to WLAN DUT A that it is roaming away from WLAN DUT A, such as causing a higher frame error rate to be reported.

The actual roaming transition may occur in the third step. STA instance A may disconnect from WLAN DUT A and may preferably be deactivated. A second instance of the same emulated STA (labeled "STA Instance B") on a second WLAN tester unit (labeled "WLAN Tester B") may be activated, and may then begin reconnecting to a second DUT (labeled "WLAN DUT B").

In the fourth step, STA instance B, after successfully reconnecting to WLAN DUT B, may preferably begin to increase its power and may further implement other functions to indicate to WLAN DUT B that it is roaming towards WLAN DUT B. Data transfer between STA instance B and WLAN DUT B may begin after reconnection.

In the fifth step, STA instance B has increased its power level to the maximum value desired by a user, and normal data transfer may proceed as indicated by the return to a bolded arrow between WLAN Tester B and WLAN DUT B.

It will be appreciated that the effect of the sequence of steps described hereinabove is to simulate the effect of an emulated STA roaming between WLAN DUTs—i.e., experiencing a translation in spatial position—without the need for actually moving any devices or using variable attenuators between devices. The inefficiency of physically moving equipment and the manufacturing tolerance issues of variable attenuator methods are thereby avoided.

It will further be appreciated that the sequence of steps described hereinabove may easily be repeated as many times as desired to simulate additional roaming events, and the selection of first and second WLAN tester units during these repeated sequences may be made in any arbitrary manner so as to simulate any desired pattern of roams. It will yet further be appreciated that the concurrent roaming of any number of additional emulated STAs may be implemented using additional STA instances within each WLAN tester unit, and any number of additional WLAN DUTs may be accommodated by using additional WLAN tester units.

Figure 6:
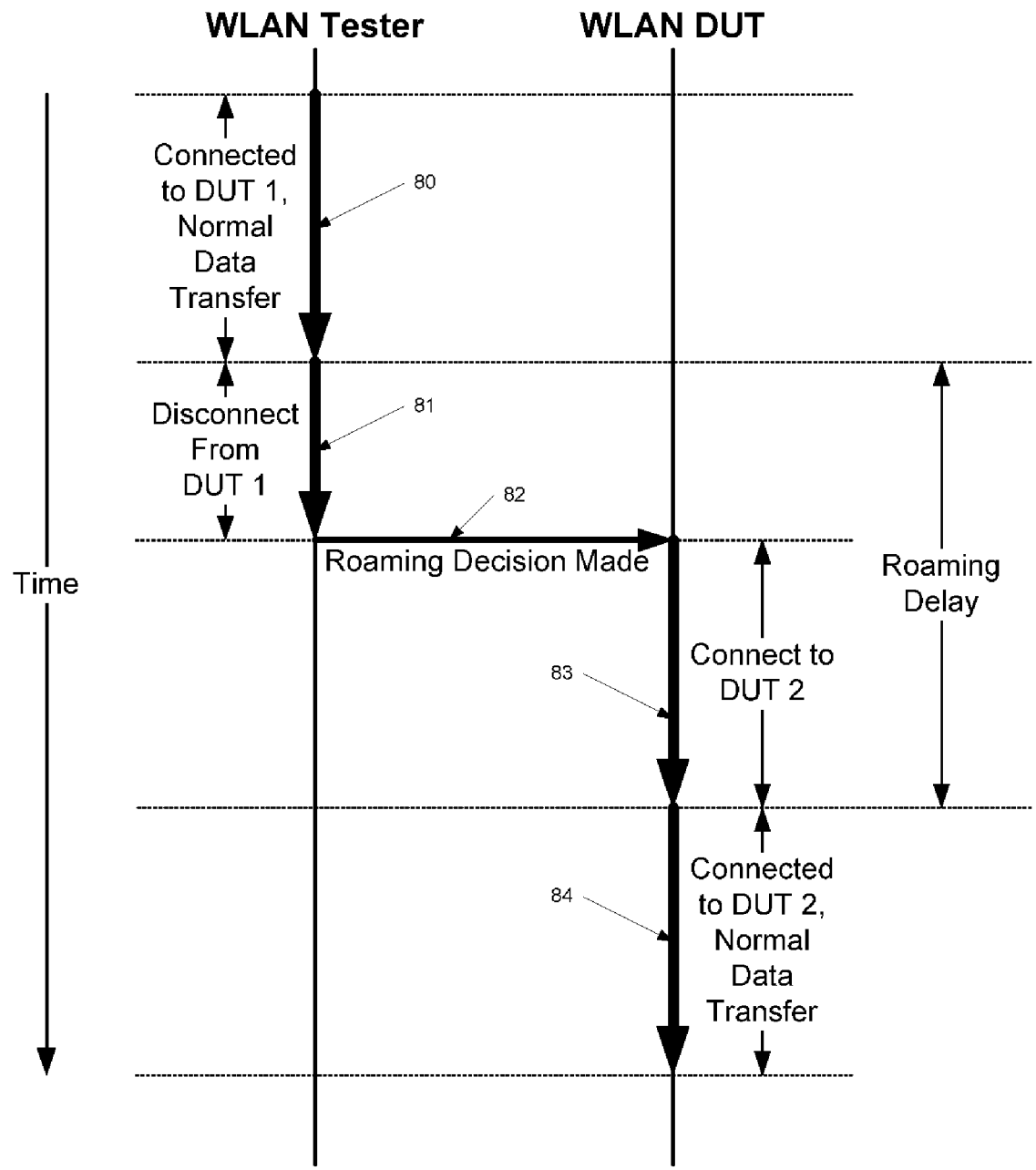
FIG. 6 is an exemplary illustration of various phases of a single roaming event wherein a measurement is made of the roaming delay.

Turning now to FIG. 6, the measurement of roaming performance parameters, which may include the roaming delay, is shown. The roaming delay may be defined as the time interval between the start and end of the roaming process; a shorter roaming delay naturally indicates a higher roaming performance. As illustrated in FIG. 6, the roaming process, during which the roaming delay is measured, may include the steps of:

(a) at step 80, having a first WLAN STA instance connected to a first DUT (referred to as "DUT 1"), and performing normal data transfer;

(b) at step 81, disconnecting from DUT 1;

(c) at step 82, deactivating the WLAN STA instance associated with DUT 1 and activating a second WLAN STA instance associated with a second DUT (referred to as "DUT 2");

(d) at step 83, connecting to DUT 2; and (e) at step 84, being connected to DUT 2, and performing normal data transfer.

The roaming delay may be defined as the time interval between the start of disconnection from DUT 1 and the completion of connection to DUT 2 (i.e., the point at which normal data transfer resumes). Statistics calculation logic 56 within each WLAN tester unit may preferably monitor the packets exchanged by MAC logic (element 53 in FIG. 4) with the associated DUT, and may determine the precise times at which connection and disconnection of each client instance with the DUT occurs, and may further count the number of packets sent to and/or received by the DUT. This data may be recorded for each roaming event in one of the counter sets (element 58 in FIG. 4) contained within statistics counter memory (element 57 in FIG. 4), and subsequently read by central controller (element 28 in FIGS. 2 and 3) via tester control (element 50 in FIG. 4).

It will be appreciated that the sets of data read from the different WLAN tester units may be correlated in order to calculate measurements such as roaming delay and packets lost during each roaming event. For example, the time difference between the point at which an instance of a given client disconnects from a DUT, and the point at which another instance of the same client subsequently connects to another DUT, may be calculated and presented as the roaming delay. As another example, the difference between the count of the number of packets transmitted to the wired ports of the DUTs for a given client, and the count of the number of packets received from the wireless ports of the DUTs for all the instances of the same client, may be calculated and presented as the total number of packets lost during the roaming process.

It is apparent that persons skilled in the art will be able to make many different types of useful roaming measurements with the data recorded by statistics counters (element 57 in FIG. 4) in the WLAN tester unit in accordance with the present description. It is further apparent that these measurements enable the mobility performance of the DUT to be quantified in an absolute sense, rather than for some specific combination of the DUT and a counterpart device (i.e., a client or an AP).

In another embodiment of the present invention, and with further reference to FIGS. 3 and 4, roaming scheduler 60 and schedule memory 61 may be preferably be omitted from WLAN tester unit 20, and the scheduling of roaming activities may be carried out by the central controller 28. This enables a reduction in the cost and complexity of WLAN tester unit 20, at the expense of an increase in the necessary processing power of central controller 28.

In another embodiment of the present invention, STA context memory 51 and STA scheduler 52 may be omitted, time-multiplexed MAC logic 53 may be replaced with a single MAC, and statistics counter sets 58 may be replaced with a single set. This eliminates the ability to emulate more than one WLAN STA at a time within each WLAN tester unit 20, but also enables a reduction in the overall cost and size of WLAN tester unit 20.

In another embodiment of the present invention, distance simulation control 55 and the associated distance simulation functions in MAC logic 53 and RF/IF chain 54 may be omitted. This eliminates the ability to simulate the effect of distance during the roaming process, but enables a reduction in the overall cost and size of WLAN tester unit 20.

In another embodiment of the present invention, an intercommunication mechanism such as a local area network (LAN) or dedicated cabling may be provided between WLAN tester units 20 to permit the state of application layer traffic protocols to be copied from an inactive STA context in one WLAN tester unit to a newly activated STA context in another WLAN tester unit. This allows the data traffic to be resumed by the activated STA instance at the precise point where it was halted when the previous STA instance was deactivated during the roaming process. Advantageously, this capability may be used to more accurately simulate the roaming process by preserving the state of application layer traffic during roaming.

In another embodiment of the present invention, central controller 28 may copy the application layer traffic state from an inactive STA context in one WLAN tester unit to a newly activated STA context in another WLAN tester unit. Advantageously, this capability may be used to more accurately simulate the roaming process by preserving the state of application layer traffic during roaming, but without requiring any direct intercommunication mechanism to be provided between WLAN tester units 20.

In another embodiment of the present invention, each WLAN tester unit may be replaced by a corresponding wired LAN tester unit having a similar capability for supporting multiple instances of a given client and for activating and deactivating client instances to emulate the movement of clients. Advantageously, this capability may be used to simulate the movement of one or more clients within a wired LAN, representing the physical disconnection of the client from one port of a LAN and its subsequent reconnection to another port of the same LAN. WLAN MAC logic 53, RF/IF/baseband 54 and distance simulation control logic 55 may, in this case, be replaced by the corresponding wired LAN MAC logic and wired LAN PHY function, but the inventive principles are otherwise unchanged.

It is apparent that the teachings of the present invention enable an improved method for efficiently measuring the roaming performance of WLAN equipment, either clients or APs. It is further apparent that the teachings of the present invention enable the measurement of mobility performance of WLAN devices without being influenced by the manufacturing tolerances of the devices. It is yet further apparent that the teachings of the present invention enable the mobility performance of any arbitrary number of WLAN devices taken as a system to be measured, using any desired roaming sequence or pattern, and carried out for any length of time and any number of roaming events, without constraints due to physical topology.

Accordingly, while this invention has been described with reference to illustrative embodiments, this description is not intended to be construed in a limiting sense. Various modifications of the illustrative embodiments, as well as other embodiments of this invention, will be apparent to persons skilled in the art upon reference to this description without departing from the scope of the invention, which is defined solely by the claims appended hereto. Therefore, that which is intended to be protected by Letters Patent is set forth in the claims and includes all variations and modifications that fall within the spirit and scope of the claim.

What is claimed is:

1. A test system for testing the roaming performance of a device under test (OUT), comprising:
   a plurality of packet transmitters for transmitting test data packets to the DUT; and
   a plurality of packet receivers for receiving test data packets from the DUT;
   wherein the test system emulates the movement of a plurality of emulated network devices while both the test system and the DUT remain physically fixed, at least one of the emulated network devices is represented by a plurality of instances, spatial movement of the emulated network device is emulated by deactivating a first instance of the plurality of instances and activating a second instance of the plurality of instances, and the activation and deactivation are performed under control of a scheduler that implements a predetermined roaming pattern.

2. The test system of claim 1, wherein the first instance and the second instance reside in different sub-units of the test system.

3. The test system of claim 1, wherein the scheduler resides in a central controller.

4. The test system of claim 1, wherein the test system disconnects the emulated network device during the deactivation process.

5. The test system of claim 1, wherein the test system connects or reconnects the emulated network device during the activation process.

6. The test system of claim 5, wherein the test system disconnects the emulated network device during the deactivation process.

7. The test system of claim 1, wherein the plurality of instances is represented by a corresponding plurality of context memory elements.

8. The test system of claim 7, wherein activation and deactivation of the instances is performed by modifying the context memory elements.

9. The test system of claim 1, wherein an ending state of the first instance is copied after deactivation and used to set up a beginning state of the second instance prior to activation.

10. The test system of claim 9, wherein the ending state includes an application layer traffic state.

11. The test system of claim 9, wherein the copying of the ending state to the beginning state is performed by a central controller.

12. The test system of claim 1, wherein a synchronization mechanism is used to coordinate the activation and deactivation of instances across the test system.

13. The test system of claim 12, wherein the synchronization mechanism is implemented by a central controller.

14. The test system of claim 1, wherein a simulated distance of the emulated network device to the DUT is changed prior to deactivation.

15. The test system of claim 1, wherein a simulated distance of the emulated network device to the DUT is changed prior to activation.

16. The test system of claim 1, wherein a simulated distance of the emulated network device to one element of the DUT is increased prior to deactivation, and the simulated distance of the emulated network device to another element of the DUT is decreased prior to activation.

17. The test system of claim 1, wherein measurement logic is provided in the test system to make measurements of roaming performance during at least one roaming event.

18. The test system of claim 17, wherein at least one of the measurements includes roaming delay.

19. The test system of claim 17, wherein at least one of the measurements includes packet loss.

20. A method of measuring the roaming performance of a DUT, comprising the steps of:
   transmitting test data packets from a tester to the DUT;
   receiving test data packets with the tester from the DUT;
   emulating a plurality of network devices connected to the DUT, each possessing a plurality of instances within the tester; and
   emulating roaming of at least one of the plurality of network devices by deactivating a first instance of the plurality of instances and activating a second instance of the plurality of instances;
   wherein the activation and deactivation of instances is performed according to a predetermined schedule.

21. The method of claim 20, wherein the schedule is maintained and processed in a centralized fashion.

22. The method of claim 20, wherein the schedule is maintained and processed in a distributed fashion.

23. The method of claim 20, including the step of disconnecting the first instance from the DUT.

24. The method of claim 20, further including a step of connecting or reconnecting the second instance to the DUT.

25. The method of claim 24, further including a step of disconnecting the first instance from the DUT.

26. The method of claim 20, further including a step of modifying the context of the first instance and the second instance in order to perform activation and deactivation.

27. The method of claim 20, further including a step of copying the context of the first instance after deactivation to the second instance prior to activation.

28. The method of claim 27, wherein the copying of the context includes the copying of application layer traffic state.

29. The method of claim 27, wherein a central controller performs the copying of the context.

30. The method of claim 27, wherein the copying of the context is performed directly between the first instance and the second instance.

31. The method of claim 20, further including a step of synchronizing the activation and deactivation of the first instance and the second instance.

32. The method of claim 20, further including a step of increasing the simulated distance to the DUT prior to deactivation of the first instance.

33. The method of claim 20, further including a step of decreasing the simulated distance to the DUT prior to activation of the second instance.

34. The method of claim 33, further including a step of increasing the simulated distance to the DUT prior to deactivation of the first instance.

35. The method of claim 20, further including a step of measuring at least one roaming performance parameter during roaming.

36. The method of claim 35, wherein the roaming performance parameter is the roaming delay.

37. The method of claim 35, wherein the roaming performance parameter is the roaming packet loss.

* * * * *